(12) United States Patent
Yarvis et al.

(10) Patent No.: US 8,429,685 B2
(45) Date of Patent: Apr. 23, 2013

(54) SYSTEM AND METHOD FOR PRIVACY-PRESERVING ADVERTISEMENT SELECTION

(75) Inventors: Mark D. Yarvis, Portland, OR (US); Sharad Garg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 139 days.

(21) Appl. No.: 12/833,035

(22) Filed: Jul. 9, 2010

(65) Prior Publication Data

US 2012/0011538 A1    Jan. 12, 2012

(51) Int. Cl.
*H04N 7/167*    (2006.01)
(52) U.S. Cl.
USPC ............... 725/31; 725/34; 725/109; 725/116
(58) Field of Classification Search ........... 725/31, 725/116, 34, 109
See application file for complete search history.

(56) References Cited

U.S. PATENT DOCUMENTS

| | | |
|---|---|---|
| 4,769,697 A | 9/1988 | Gilley et al. |
| 5,515,098 A | 5/1996 | Carles |
| 5,661,516 A | 8/1997 | Carles |
| 5,911,773 A | 6/1999 | Mutsuga et al. |
| 6,334,110 B1 | 12/2001 | Walter et al. |
| 6,401,034 B1 | 6/2002 | Kaplan et al. |
| 6,708,335 B1 | 3/2004 | Ozer et al. |
| 6,941,197 B1 | 9/2005 | Murakami et al. |
| 6,947,881 B1 | 9/2005 | Murakami et al. |
| 7,134,130 B1 | 11/2006 | Thomas |
| 7,363,151 B2 | 4/2008 | Nomura et al. |
| 7,546,619 B2 | 6/2009 | Anderson et al. |
| 7,636,785 B2 | 12/2009 | Shahine et al. |

(Continued)

FOREIGN PATENT DOCUMENTS

| | | |
|---|---|---|
| CN | 102223393 A | 10/2011 |
| CN | 102316364 A | 1/2012 |

(Continued)

OTHER PUBLICATIONS

Yarvis et al., "Context Information Utlizing Systems, Apparatus and Methods," U.S. Appl. No. 13/130,203, filed May 19, 2011, 35 pages.

(Continued)

*Primary Examiner* — Jun Fei Zhong
*Assistant Examiner* — Jivka Rabovianski
(74) *Attorney, Agent, or Firm* — Garrett IP, LLC

(57) ABSTRACT

Methods and systems to provide targeted advertising in a subscription television setting, wherein the households that receive the targeted advertisement may retain anonymity. This may be achieved by marrying an anonymization protocol and infrastructure with a mechanism for STB selection and reporting. This anonymizes the set of households that are selected to play an ad, by ensuring that when an STB meets defined criteria and sends a 'criteria met' message (during the selection process) or 'ad shown' message (during a validation or counting process) to a head end, an STB or household identifier is not revealed, thus anonymizing the household information from the head end. In addition, this allows the head end to control the ad campaign process by advertising only to those households that meet specified criteria, and to count the number of actual instances in which an ad was displayed. The head end is able to count the number of times an ad was displayed, without knowing which particular household(s) viewed the ad.

14 Claims, 13 Drawing Sheets

U.S. PATENT DOCUMENTS

| | | |
|---|---|---|
| 7,698,236 B2 | 4/2010 | Cox et al. |
| 7,730,509 B2 | 6/2010 | Boulet et al. |
| 7,831,384 B2 | 11/2010 | Bill |
| 7,835,859 B2 | 11/2010 | Bill |
| 7,904,461 B2 | 3/2011 | Baluja et al. |
| 7,974,873 B2 | 7/2011 | Simmons et al. |
| 8,108,405 B2 | 1/2012 | Marvit et al. |
| 2001/0049620 A1 | 12/2001 | Blasko |
| 2002/0072952 A1 | 6/2002 | Hamzy et al. |
| 2002/0078444 A1 | 6/2002 | Krewin et al. |
| 2002/0129368 A1 | 9/2002 | Schlack et al. |
| 2002/0174025 A1 | 11/2002 | Hind et al. |
| 2003/0037333 A1 | 2/2003 | Ghashghai et al. |
| 2004/0003392 A1 | 1/2004 | Trajkovic et al. |
| 2004/0133923 A1* | 7/2004 | Watson et al. ............ 725/134 |
| 2004/0240676 A1 | 12/2004 | Hashimoto et al. |
| 2005/0097595 A1 | 5/2005 | Lipsanen et al. |
| 2005/0160002 A1 | 7/2005 | Roetter et al. |
| 2005/0283699 A1 | 12/2005 | Nomura et al. |
| 2006/0090131 A1 | 4/2006 | Kumagai |
| 2006/0106944 A1 | 5/2006 | Shahine et al. |
| 2006/0241862 A1 | 10/2006 | Ichihara et al. |
| 2007/0010942 A1 | 1/2007 | Bill |
| 2007/0073477 A1 | 3/2007 | Krumm et al. |
| 2007/0073682 A1 | 3/2007 | Adar et al. |
| 2007/0157262 A1 | 7/2007 | Ramaswamy et al. |
| 2008/0021632 A1 | 1/2008 | Amano |
| 2008/0027639 A1 | 1/2008 | Tryon |
| 2008/0040370 A1 | 2/2008 | Bosworth et al. |
| 2008/0040475 A1 | 2/2008 | Bosworth et al. |
| 2008/0052168 A1 | 2/2008 | Peters et al. |
| 2008/0097822 A1 | 4/2008 | Schigel et al. |
| 2008/0162186 A1 | 7/2008 | Jones |
| 2009/0177528 A1 | 7/2009 | Wu et al. |
| 2009/0216704 A1 | 8/2009 | Zheng et al. |
| 2009/0307205 A1 | 12/2009 | Churchill et al. |
| 2010/0042317 A1 | 2/2010 | Tajima et al. |
| 2010/0049602 A1 | 2/2010 | Softky |
| 2010/0076997 A1 | 3/2010 | Koike et al. |
| 2010/0106603 A1 | 4/2010 | Dey et al. |
| 2010/0161492 A1* | 6/2010 | Harvey et al. ............ 705/50 |
| 2010/0299225 A1 | 11/2010 | Aarni et al. |
| 2011/0106436 A1 | 5/2011 | Bill |
| 2011/0154385 A1 | 6/2011 | Price et al. |
| 2011/0246213 A1 | 10/2011 | Yarvis et al. |
| 2011/0246214 A1 | 10/2011 | Yarvis et al. |
| 2011/0246283 A1 | 10/2011 | Yarvis et al. |
| 2011/0246300 A1 | 10/2011 | Yarvis et al. |
| 2011/0246469 A1 | 10/2011 | Yarvis et al. |
| 2011/0247029 A1 | 10/2011 | Yarvis et al. |
| 2011/0247030 A1 | 10/2011 | Yarvis et al. |
| 2011/0251788 A1 | 10/2011 | Yarvis et al. |
| 2011/0251918 A1 | 10/2011 | Yarvis et al. |
| 2011/0251990 A1 | 10/2011 | Yarvis et al. |
| 2011/0258203 A1 | 10/2011 | Wouhaybi et al. |
| 2011/0264553 A1 | 10/2011 | Yarvis et al. |
| 2011/0264613 A1 | 10/2011 | Yarvis et al. |
| 2011/0321073 A1 | 12/2011 | Yarvis et al. |
| 2012/0253920 A1 | 10/2012 | Yarvis et al. |

FOREIGN PATENT DOCUMENTS

| | | |
|---|---|---|
| GB | 2481490 A | 12/2011 |
| JP | 2000-198412 A | 7/2000 |
| JP | 2006-333531 A | 12/2006 |
| JP | 2008-152564 A | 7/2008 |
| JP | 2009-528639 A | 8/2009 |
| KR | 10-2002-0024645 A | 4/2002 |
| KR | 10-2006-0122372 A | 11/2006 |
| KR | 10-2007-0061601 A | 6/2007 |
| KR | 10-2009-0014846 A | 2/2009 |
| WO | 02/32136 A2 | 4/2002 |
| WO | 02/082214 A2 | 10/2002 |
| WO | 2007/101263 A2 | 9/2007 |
| WO | 2008/064071 A2 | 5/2008 |
| WO | 2009/099876 A2 | 8/2009 |
| WO | 2011/075119 A1 | 6/2011 |
| WO | 2011/075120 A1 | 6/2011 |
| WO | 2011/075137 A1 | 6/2011 |
| WO | 2011/130034 A2 | 10/2011 |
| WO | 2011/163411 A2 | 12/2011 |
| WO | 2012/006237 A2 | 1/2012 |
| WO | 2011/130034 A3 | 4/2012 |
| WO | 2012/006237 A3 | 4/2012 |
| WO | 2012/135239 A2 | 10/2012 |

OTHER PUBLICATIONS

Yarvis et al., "Systems, Apparatus and Methods Using Probabilistic Techniques in Trending and Profiling and Template-Based Predictions of User Behavior in Order to Offer Recommendations," U.S. Appl. No. 13/130,734, filed May 23, 2011, 45 pages.

Wouhaybi et al., "Methods and Systems for Relationship Characterization and Utilization From a User's Social Networks," U.S. Appl. No. 12/761,448, filed Apr. 16, 2010, 23 pages.

Yarvis et al., "Techniques for Offering Context to Service Providers Utilizing Incentives and User-Controlled Privacy," U.S. Appl. No. 13/129,968, filed May 18, 2011, 43 pages.

Yarvis et al., "Techniques for Customization," U.S. Appl. No. 12/821,376, filed Jun. 23, 2010, 28 pages.

Yarvis et al., "System and Method for Viewership Validation Based on Cross-Device Contextual Inputs," U.S. Appl. No. 13/078,565, filed Apr. 1, 2011, 28 pages.

International Search Report and Written Opinion received for PCT Patent Application No. PCT/US2009/068131, mailed on Sep. 1, 2010, 11 pages.

International Search Report and Written Opinion received for PCT Patent Application No. PCT/US2009/068689, mailed on Aug. 26, 2010, 11 pages.

International Search Report and Written Opinion received for PCT Patent Application No. PCT/US2009/068129, mailed on Aug. 31, 2010, 12 pages.

Office Action received for United Kingdom Patent Application No. GB1108772.3, mailed on Jun. 2, 2011, 2 pages.

"Nielsen ratings," From Wikipedia, the free encyclopedia, retrieved on Aug. 17, 2011, webpage available at: http://en.wikipedia.org/wiki/Nielsen_ratings.

Schonfeld, "Google Now Lets You Target Ads At Yourself," TechCrunch, posted on Mar. 11, 2009, webpage available at: http://techcrunch.com/2009/03/11/google-now-lets-you-target-ads-at-yourself/.

"Introducing Google TV," retrieved on Aug. 17, 2011, webpage available at: http://www.google.com/tv/.

"Eloda Protocol Suite of Products," retrieved on Aug. 17, 2011, webpage available at: http://www.eloda.com/en/protocol/.

"TRA—The Right Audience," TRA, retrieved on Aug. 17, 2011, webpage available at: http://www.traglobal.com/whatwedo.php.

Combined Search and Examination Report, received for United Kingdom Application No. 1108772.3, mailed on Sep. 26, 2011, 5 pages.

International Search Report and Written Opinion, received for PCT Patent Application No. PCT/US2011/031064, mailed on Dec. 14, 2011, 8 pages.

International Search Report and Written Opinion, received for PCT Patent Application No. PCT/US2011/041516, mailed on Feb. 24, 2012, 9 pages.

International Search Report and Written Opinion, received for PCT Patent Application No. PCT/US2011/042786, mailed on Feb. 23, 2012, 10 pages.

International Search Report and Written Opinion, received for PCT Application No. PCT/US2011/049228, mailed on Mar. 27, 2012, 9 pages.

International Search Report and Written Opinion received for Patent Application No. PCT/US2012/030776, mailed on Oct. 29, 2012, 9 pages.

* cited by examiner

SYSTEM AND METHOD FOR PRIVACY-PRESERVING ADVERTISEMENT SELECTION

BACKGROUND

Advertisements are sometimes intended for a particular group or demographic of potential consumers. Targeted advertisement in the context of subscription television (e.g., cable or satellite) is often inserted by a user's set-top box (STB) into advertising slots in a live Moving Picture Experts Group (MPEG) transport stream. Often a head end may control which set-top box plays a particular ad. Protocols often claim to be "privacy preserving" because the set-top box makes the selection decision, and the private information used to make that decision may be contained in the STB, rather than at the cable/broadcast head end. However, in such an arrangement private information may be inferred from the communication between the STB and the head end during the processes of (1) selecting households to play an ad and (2) counting the number of times the ad was presented by these STBs.

One protocol for targeted advertising, in which households are selected by the head end to play an ad, is as follows. An ad campaign is provided to the cable/broadcast head end from some external source (such as media buyer or advertiser). That ad campaign has an associated set of criteria that describes the desired viewers (e.g., households with net income greater than $100,000, or families with preschool children) and a total number of households to reach. Each STB contains information about its household (e.g., net income). When an opportunity to show an ad is approaching, the head end sends an "ad opportunity" message to all STBs, where the message contains an identifier for the advertisement (the contents of the ad may be pushed to the STB separately) and also contains the criteria for showing that ad.

The STBs use the household's private information to evaluate the criteria for a match. If there is a match, the STB sends a "criteria met" message to the head end, identifying that STB. The head end selects a subset of the households from those that responded (the subset corresponding to the number of households that need to be reached), and sends a "show ad" message to each selected STB, requesting that the ad be shown. The ads will be locally stored on the STB hard disk (HD) in advance, and shown locally from the HD. To minimize overhead, a distributor of the ad can push ad files onto the STB during low-traffic periods (e.g., in the middle of the night) when bandwidth is least utilized. After the ad is shown, an "ad shown" message is sent from the STB to the head end, allowing the individual showing of the advertisement to be counted. This is necessary in order to verify that the ad has been shown to the required number of households.

While the above protocol does not require the user's specific private information to leave the STB, the "criteria met" message does inform the head end (any other party who can access this message) that a specific STB meets specific criteria. While explicit private information (e.g., the exact household net income) is not sent from STB to the head end, by sending the "criteria met" message, the STB is providing private information about its specific household to the head end (e.g., by stating that the household meets the criteria, the STB is indicating to the head end that this household's net income is greater than $100,000, for example). Therefore the conventional protocol still reveals sensitive information.

BRIEF DESCRIPTION OF THE DRAWINGS/FIGURES

Figure 9:
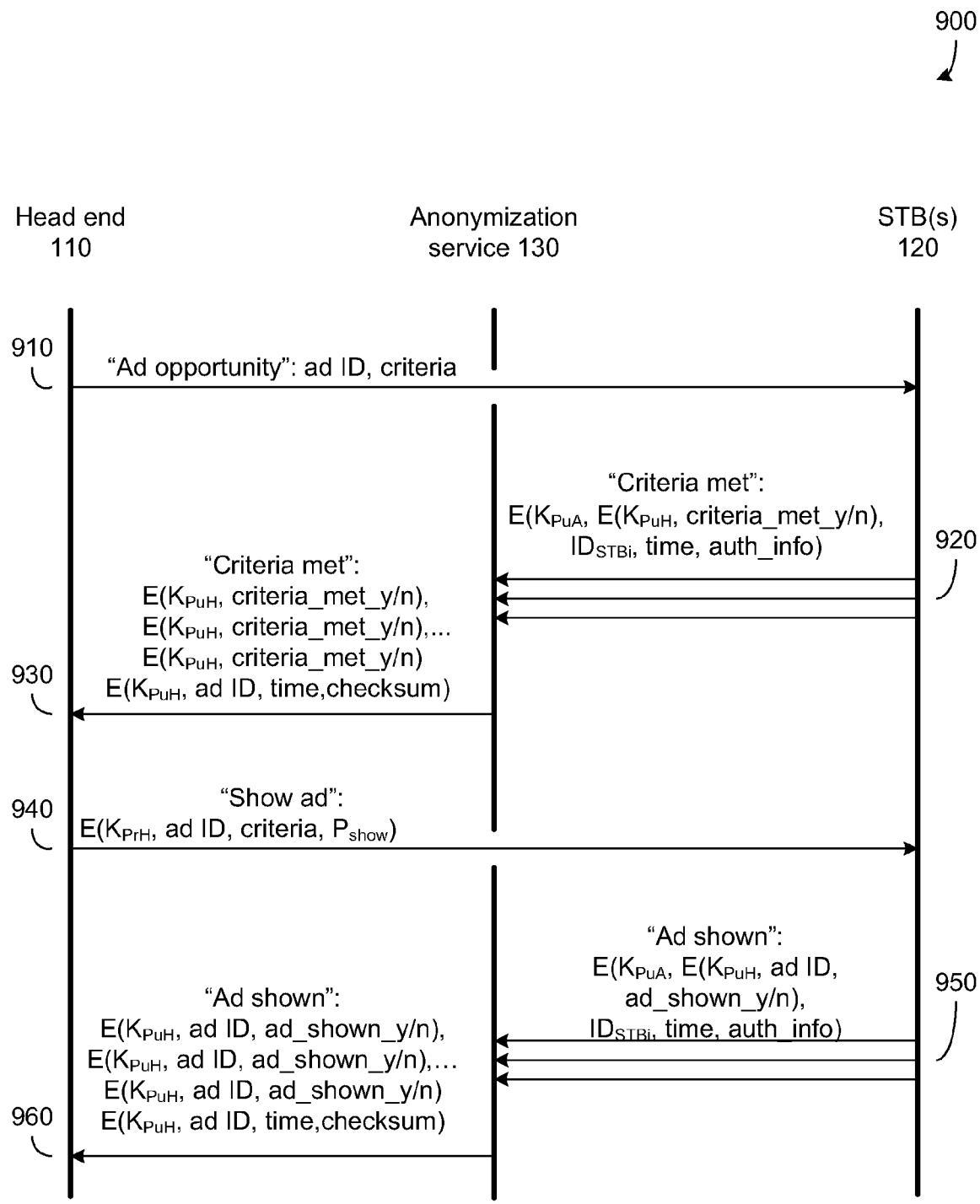

FIG. 9 schematically illustrates the use of the anonymization protocol according to an embodiment.

Figure 10:
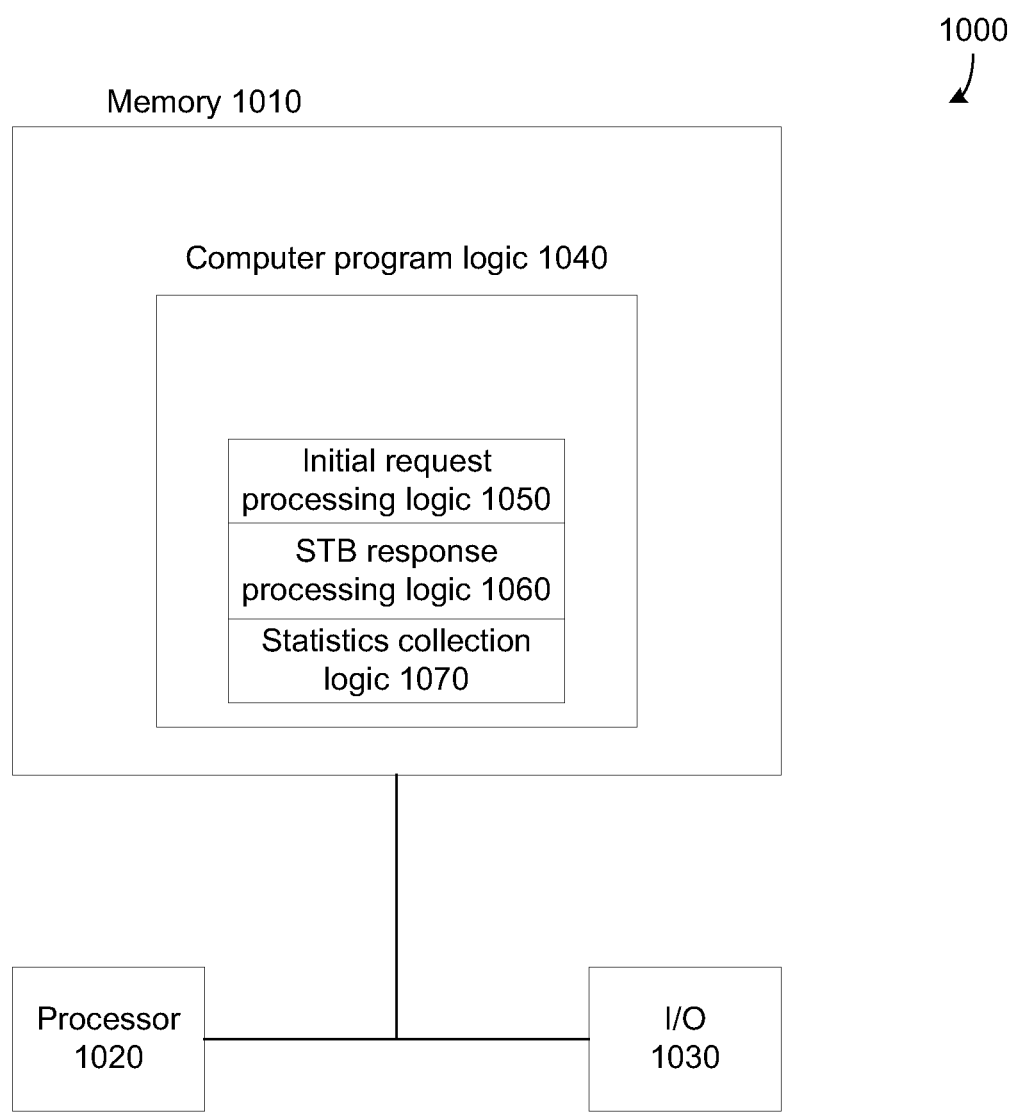

FIG. 10 is a block diagram illustrating a software or firmware embodiment of logic that is executed at a head end.

Figure 11:
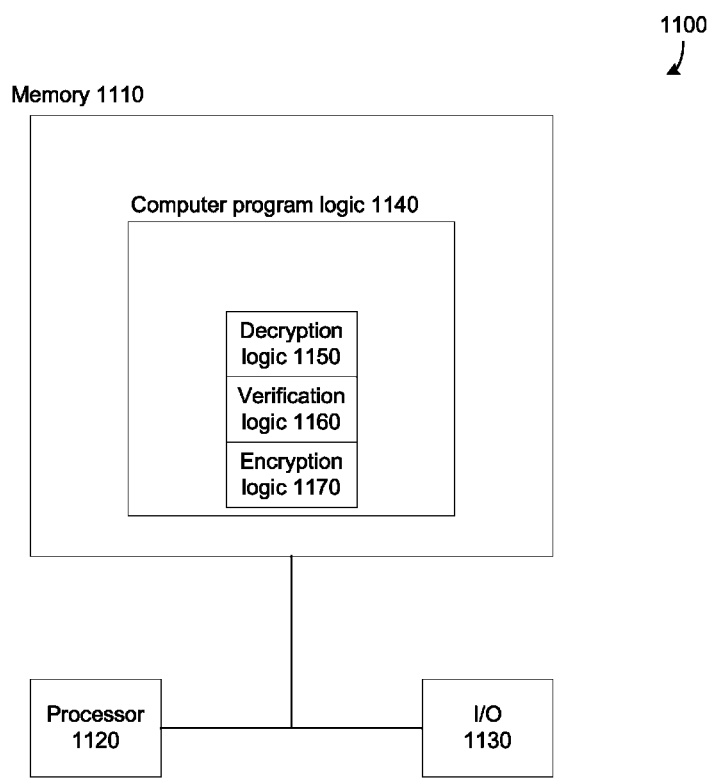

FIG. 11 is a block diagram illustrating a software or firmware embodiment of logic that is executed at an anonymization node.

Figure 12:
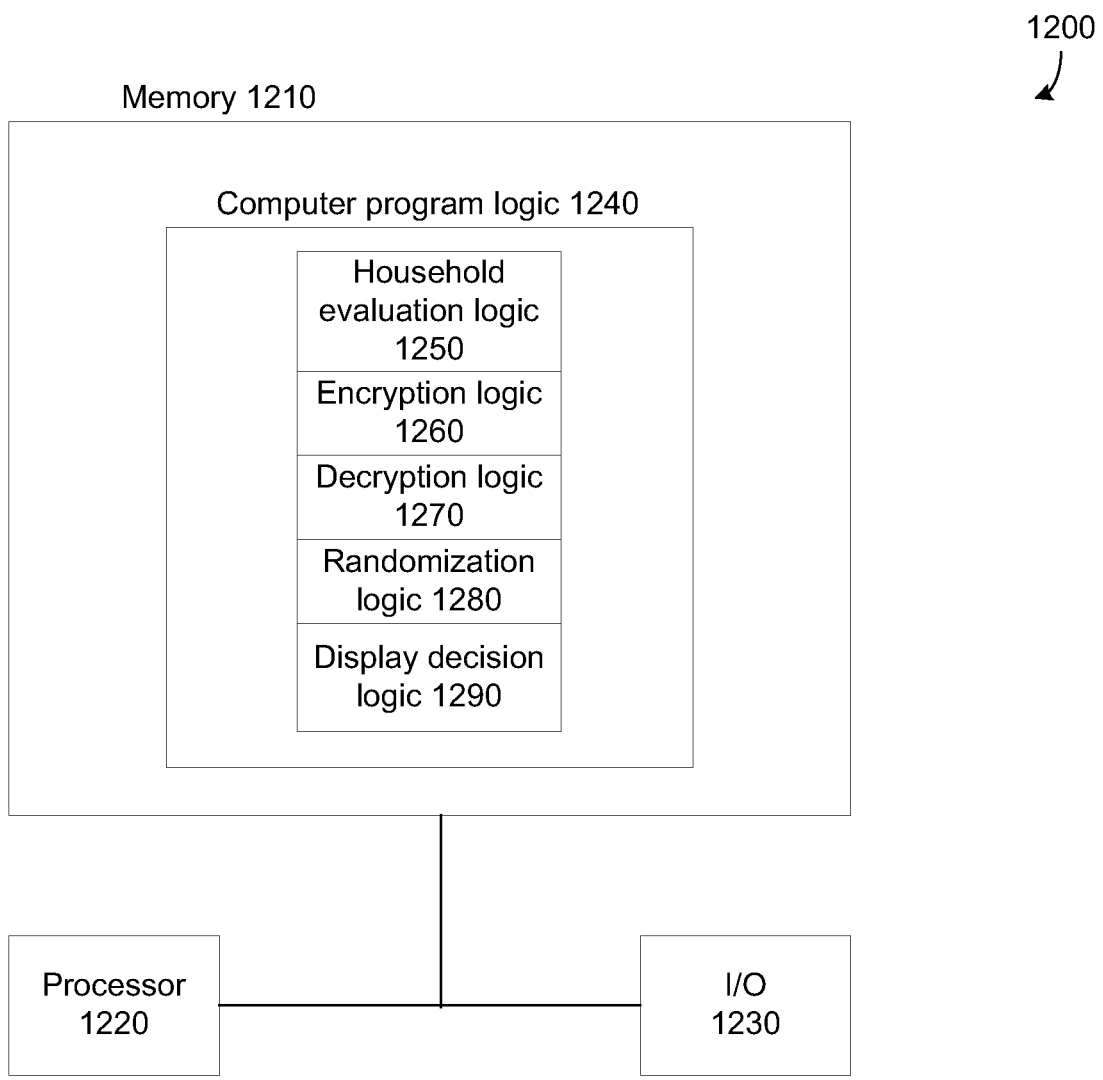

FIG. 12 is a block diagram illustrating a software or firmware embodiment of logic that is executed at an STB.

In the drawings, the leftmost digit(s) of a reference number identifies the drawing in which the reference number first appears.

DETAILED DESCRIPTION

A preferred embodiment is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems to provide targeted advertising in a multimedia setting, such as, for example, subscription television (cable or satellite) or internet content delivery (e.g., hulu.com or youtube.com). The households that receive the targeted advertisement may retain anonymity and prevent the exposure of private information. This may be achieved by using an anonymization protocol and infrastructure with a mechanism for STB selection and reporting. This may anonymize the set of households that are selected to play an ad by ensuring that when an STB meets defined criteria and sends a 'criteria-met' message (during the selection process) or 'ad shown' message (during a validation or counting process) to a head end, an STB or household identifier is not revealed, thus anonymizing the household information from the head end or other parties. In addition, this may simultaneously allow the head end to control the ad campaign process by advertising only to those households that meet specified criteria, and to count the number of actual instances in which an ad was displayed. The head end may also be able to count the number of times an ad is displayed, without knowing which individual households viewed the ad.

An anonymization service may utilize the anonymization protocol to allow the head end to collect anonymous data from STBs during the selection process. A selection protocol may allow the head end to control which STBs may play a specific ad. The anonymization service may help determine the answer to two questions: (1) How many households meet the criteria for displaying the ad? and (2) How many STBs played a specific ad?

Figure 1:
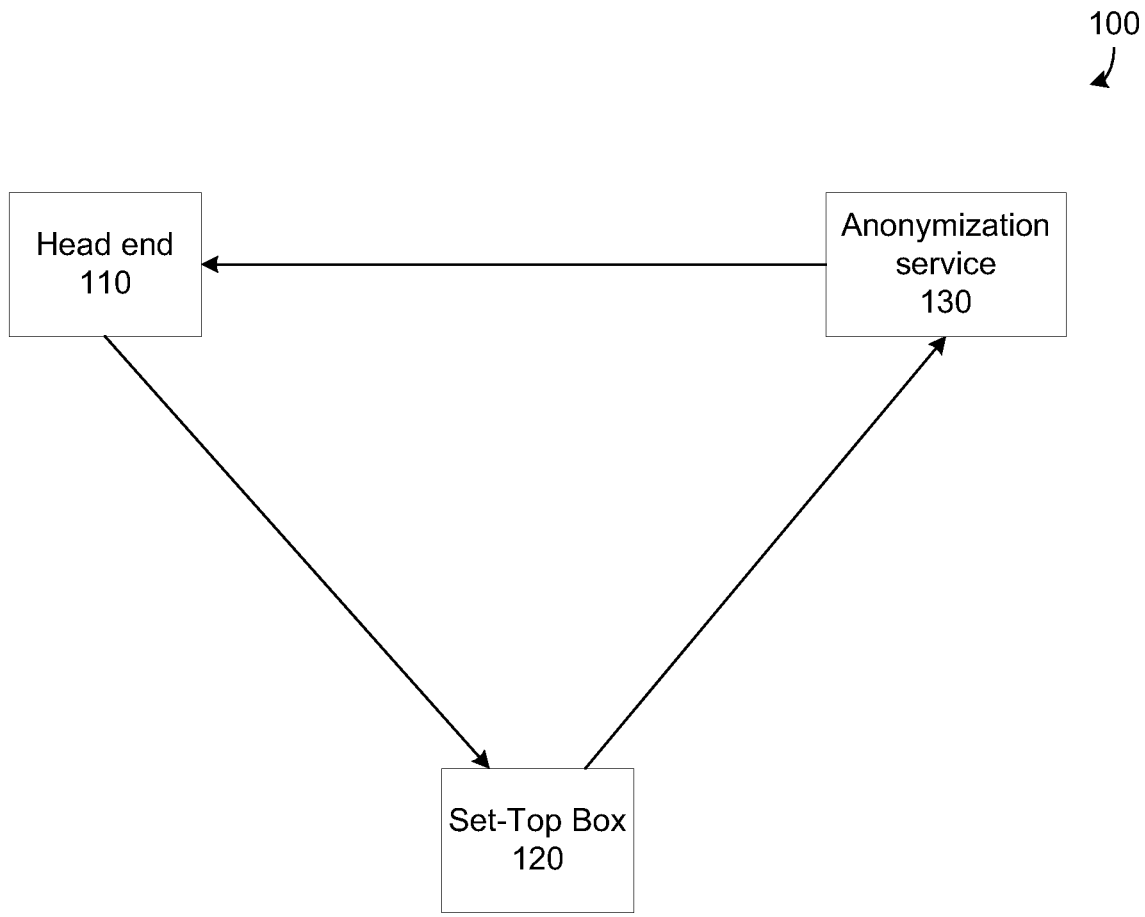
FIG. 1 is a block diagram showing the topology of a system that may implement an embodiment.

FIG. 1 is a block diagram illustrating components that may be used in an embodiment. A head end 110 is shown in communication with an STB 120. This connection may allow the head end 110 to inform the STB 120 that an opportunity exists to display an advertisement. The head end 110 may also identify the ad and specify the criteria that must be met before STB 120 can show the ad. This channel may also allow the head end to request that the STB 120 show the ad.

If the STB 120 determines that its household meets the stated criteria, then STB 120 may communicate this determination to the head end 110, via an anonymization service 130. The anonymization service 130 may allow the STB 120 to tell the head end 110 that the household of STB 120 meets the criteria, in a manner that preserves the anonymity of the household of STB 120. The process by which the anonymity is preserved will be described in greater detail below.

After the advertisement is shown by STB 120, the fact that the ad was shown may be communicated by the STB 120 to the head end 110, via the anonymization service 130. Because this communication would otherwise reveal that the household of STB 120 meets the stated criteria, the use of service 130 may conceal this fact, as will be described in greater detail below.

While a single STB 130 is shown in FIG. 1, in embodiments of the invention, one or more STBs may be present in a single household. All such STBs would be in communication with head end 110 and anonymization service 130, in the same manner as STB 120. Moreover, more than one household will typically have STBs; again, each of these STBs, in their respective households, maybe in communication with head end 110 and anonymization service 130 in the same manner as STB 120.

The structure of the head end 110 and the STB 120 may vary in various embodiments, as would be understood by a person of ordinary skill in the art. The anonymization service 130 may be embodied in a network node that includes a server or other device having one or more programmable processors, or otherwise having the circuitry required for connectivity to the head end 110 and the STB 120. Such a network node may be viewed as an anonymization node. As will be described in greater detail below, anonymization service 130 may also include functionality that implements an anonymization protocol in hardware, software, firmware, or some combination thereof.

Figure 2:
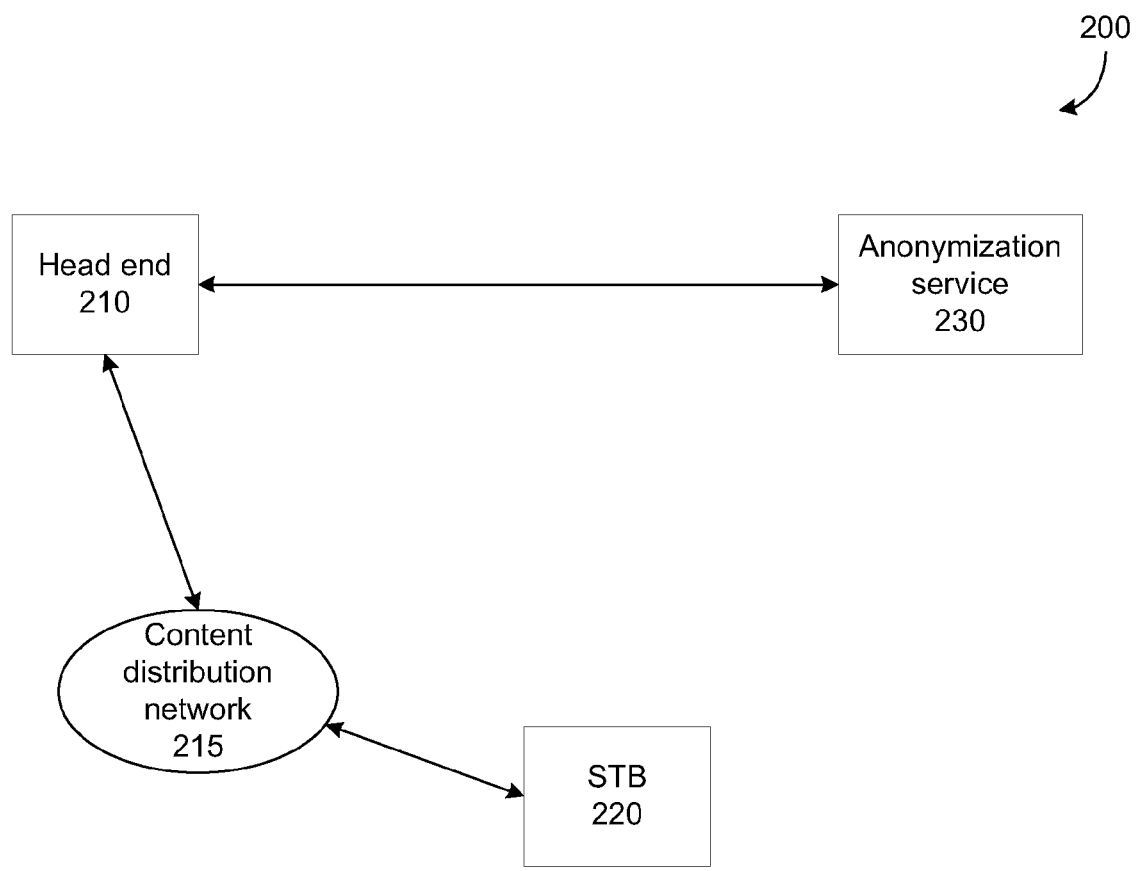
FIG. 2 is a block diagram showing an alternative topology of a system that may implement an embodiment.

In an embodiment of the invention, communications between a head end and an STB may pass through a content distribution network. This is illustrated in the embodiment of FIG. 2. Here, a head end 210 is shown in communication with an STB 220, via a content distribution network 215. In such an embodiment, an anonymization service 230 may be in communication with head end 210. Moreover, the anonymization service 230 may communicate with the STB 230 via the head end 210 and its content distribution network 215. As will be described below, an anonymization protocol may be used to conceal private information of households from the head end 210.

Figure 3A:
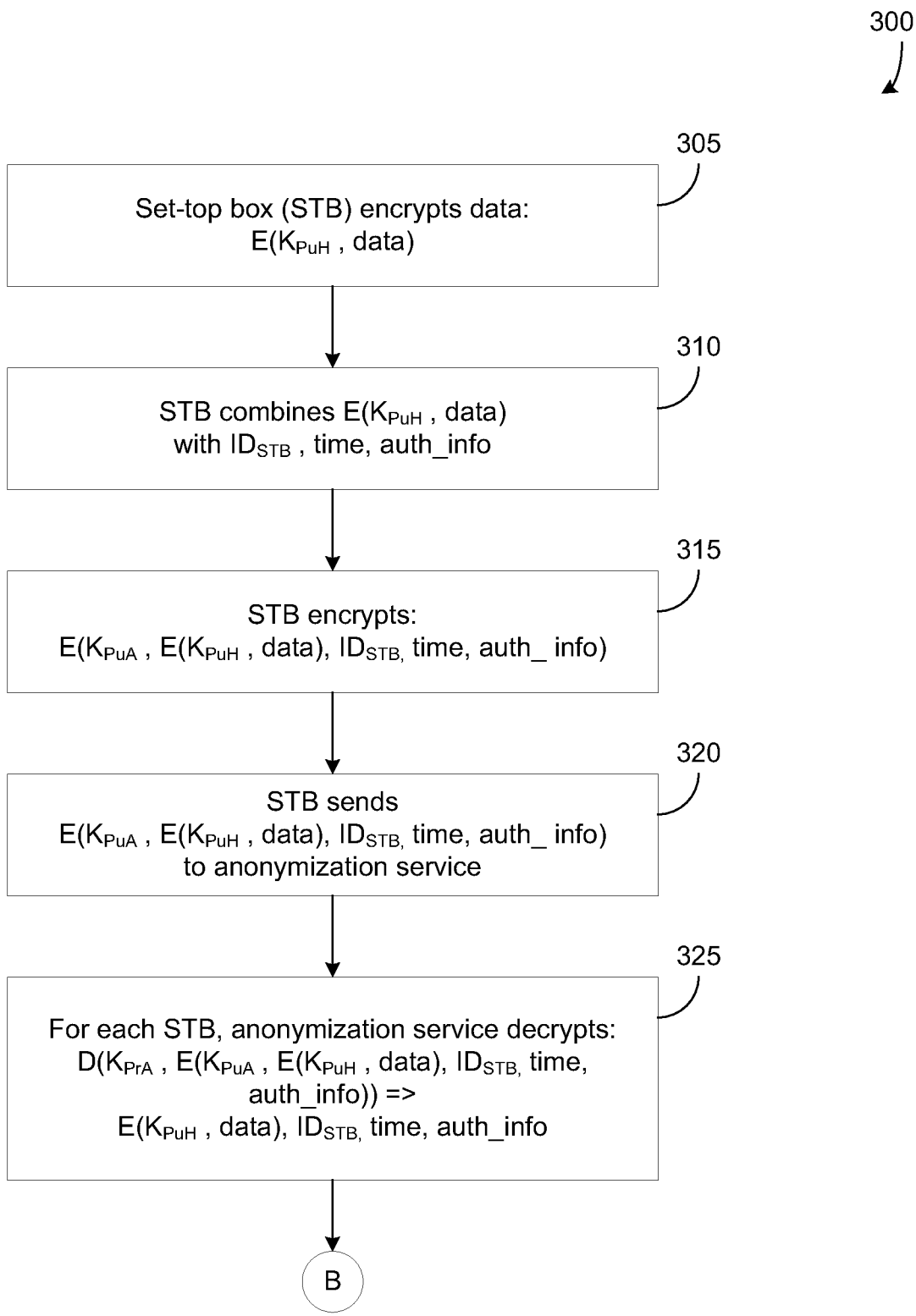
FIGS. 3A and 3B show a flowchart that illustrates an anonymization protocol, according to an embodiment.
Figure 3B:
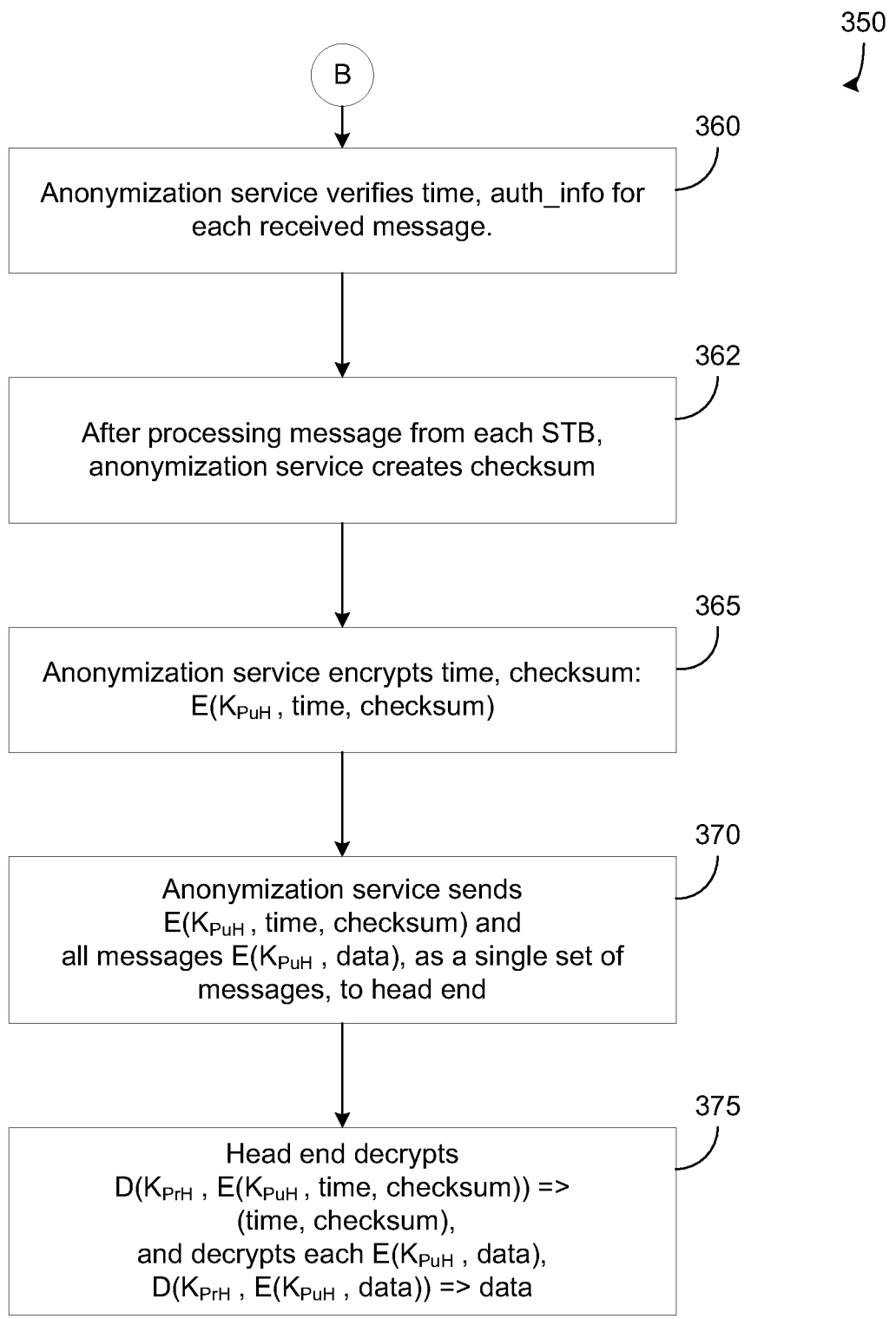

An anonymization protocol is illustrated in FIGS. 3A and 3B, according to an embodiment. Note that in the following description and figures, $E(K_i, x, \ldots)$ denotes encryption of data field(s) (x, ...) using a key $K_i$. Analogously, $D(K_j, y, \ldots)$ denotes decryption of data field(s) y using a key $K_j$.

The protocol as illustrated in FIGS. 3A and 3B may be used to preserve the privacy of households during a targeted advertising process. The steps of the illustrated protocol are shown for the transmission of generic data from STBs to a head end. As will be described below, this data may be an indication as to whether a household meets certain marketing criteria, or may be an indication that an ad was shown in a household, for example.

At 305, an STB may perform a public key encryption process to encrypt data. To perform this encryption, the STB may use the public component of a public key pair, where the corresponding private component is held by the head end. This public encryption key associated with the head end is referred to herein as $K_{PuH}$, and the associated private component held at the head end is referred to as $K_{PrH}$. The encryption of the data is therefore shown at 305 as $E(K_{PuH}, \text{data})$ i.e., the encryption of data using the key $K_{PuH}$. Note that all encryptions of data using public keys described below can also be implemented as encryption of a symmetric key using a public key, where the symmetric key is used in turn to encrypt the data.

At 310, the STB may combine this encrypted result with an identifier for the STB (shown as "$ID_{STB}$"), a timestamp ("time"), and authentication information ("auth_info") in an embodiment. The timestamp may be an indication of the time and date, or may be the value of a periodically incrementing counter. The authentication information may be a system-wide or local password, a password specific to the STB, or a hash of the data field signed using a private key known to the STB (where the public component of this key is known to the anonymization service). The timestamp and the authentication information may be used at the recipient (the anonymization service) to verify the legitimacy of the communication, as will be described below. The combination of $E(K_{PuH}, \text{data})$, $ID_{STB}$, the timestamp, and the authentication information may be represented as a concatenation of the binary representations of these values in an embodiment.

At 315, the STB may encrypt this combination using the public component of another public key pair, $K_{PuA}$. The private component of this key pair, $K_{PrA}$, may be held at the anonymization service. At 315, the STB therefore performs $E(K_{PuA}, E(K_{PuH}, \text{data}), ID_{STB}, \text{time}, \text{auth\_info})$.

At 320, the STB may send the result to the anonymization service. Note that each STB that received the "ad opportunity" message from the head end may perform the sequence 305-320.

At 325, the anonymization service may decrypt each received message $E(K_{PuA}, E(K_{PuH}, \text{data}), ID_{STB}, \text{time}, \text{auth\_info})$ using its private key $K_{PrA}$. There should be one such message received from every STB that received the "ad opportunity" message from the head end. The anonymization service may therefore perform the operation $D(K_{PrA}, E(K_{PuA}, E(K_{PuH}, \text{data}), ID_{STB}, \text{time}, \text{auth\_info}))$ for each received message. This may result in the values $E(K_{PuH}, \text{data}), ID_{STB}, \text{time}, \text{auth\_info}$ for each STB. Referring now to FIG. 3B, at 360, for each message received from an STB, the anonymization service may then check the timestamp to verify that it is sufficiently recent and does not match the timestamp of any other previously received message. If the timestamp is too old or matches that of a previously received message, then the newly received message may be a duplicate or delayed message, perhaps sent by a hacker or other third party intending to compromise the protocol. The anonymization service may also check the authentication data to verify the legitimacy of the sending party (i.e., the STB).

At 362, the anonymization service may compute a checksum over all messages $E(K_{PuH}, data)$ received from the respective STBs. The checksum may be a cyclic redundancy code (CRC) or other checksum value. In an alternative embodiment, the checksum may be the output of a cryptographic function. At 365, the anonymization service may encrypt a new timestamp and the checksum, using $K_{PuH}$:

$E(K_{PuH}, time, checksum)$

At 370, the anonymization service may send $E(K_{PuH}, time, checksum)$ and each $E(K_{PuH}, data)$ to the head end as a collective set of messages. By sending the full set of messages $E(K_{PuH}, data)$, one from each STB, the anonymity of each individual STB may be preserved. At 375, the head end may decrypt these values. The head end may therefore perform the decryption $D(K_{PrH}, E(K_{PuH}, time, checksum))$ and recover the time and checksum values. The head end may also perform $D(K_{PrH}, E(K_{PuH}, data))$ for each $E(K_{PuH}, data)$ and recover the data.

As a result of this protocol, the head end may never see the identity of the source of the data (i.e., the STB and its household). The source may be identified at the anonymization service, but may not be revealed to the head end. Moreover, because the identity of the source may be encrypted between the STB and the anonymization service, an outside observer may likewise be unable to identify the source of the data. In addition, because the data remains encrypted until it is received at the head end, the anonymization service may not determine what information was sent from the STB to the head end.

Figure 4:
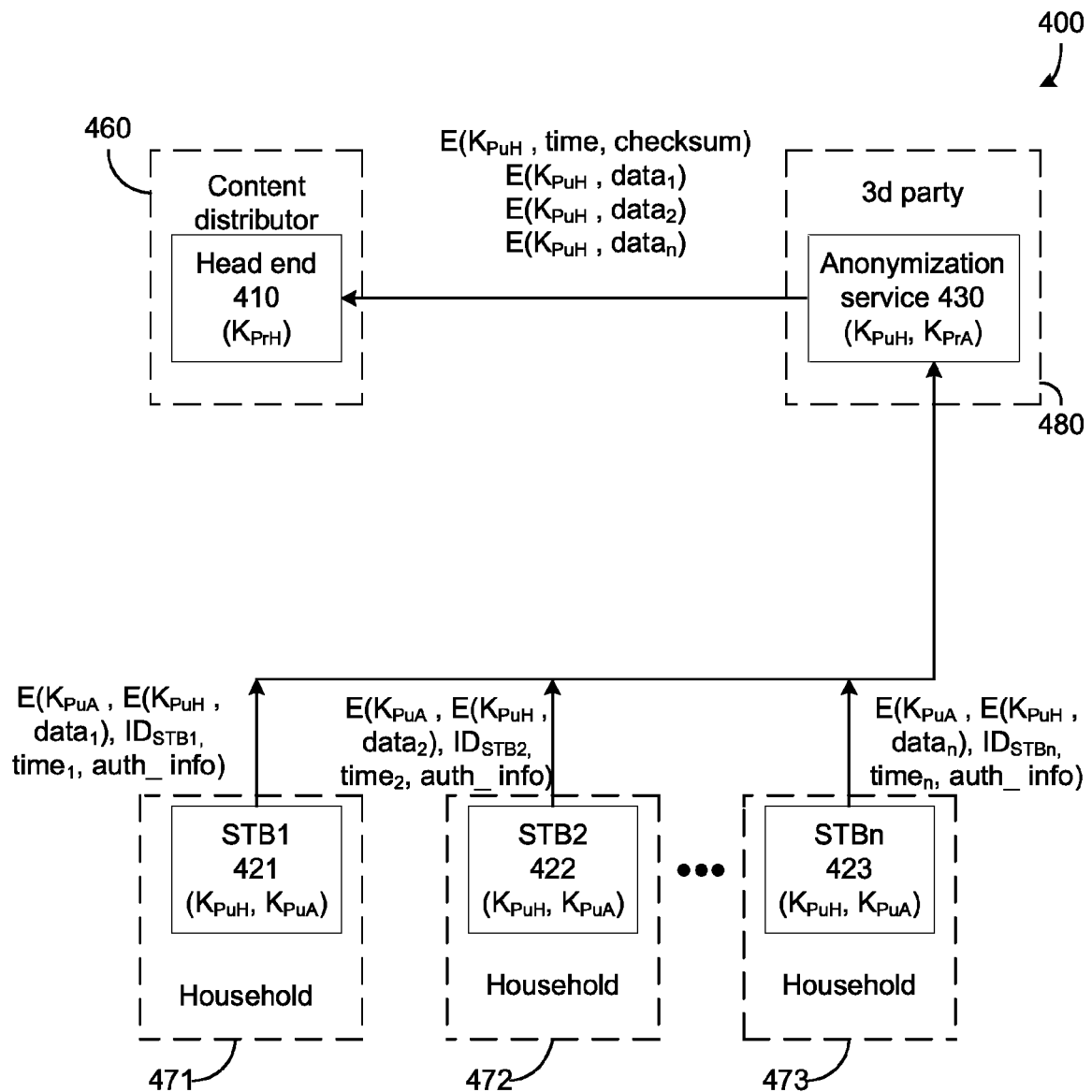
FIG. 4 is a block diagram of illustrating the use of the anonymization protocol in an exemplary topology, according to an embodiment.

The flow of information is illustrated in FIG. 4, according to an embodiment. Each of several STBs, STB1, . . . 3 (also labeled as 421, 422, . . . , 423 respectively) may perform a public key encryption process to encrypt the data. To perform this encryption, the STBs may use the public component $K_{PrH}$ of a public key pair, where the corresponding private component $K_{PuH}$ may be held by the head end 410. The result of the encryption of the data is shown as $E(K_{PuH}, data_i)$.

Each STB may combine this encrypted result with an identifier for the STB (shown as "$ID_{STBi}$"), a timestamp, and authentication information in an embodiment. The timestamp and the authentication information may be used at the recipient (the anonymization service 430) to verify the legitimacy of the communication.

Each STB may encrypt this combination using the public component $K_{PuA}$. The private component $K_{PrA}$ of this key pair may be held at the anonymization service 430. Each STBi may therefore perform $E(K_{PuA}, E(K_{PuH}, data_i), ID_{STBi}, time, auth\_info)$.

Each STB may then send its result to the anonymization service 430.

The anonymization service 430 may decrypt the received messages using its private key $K_{PrA}$. This results in the values $E(K_{PuH}, data), ID_{STBi}$, time, and auth_info. The anonymization service 430 may then check the timestamp to verify that it does not match the timestamp of any other previously received message. The anonymization service 430 may also check the authentication data to verify the legitimacy of each sending party (i.e., $STB_i$).

The anonymization service 430 may receive the results $E(K_{PuH}, data)$ from many nodes, one from each $STB_i$. After a timeout, the anonymization service may gather up all of these results, and assemble them in a random order. The anonymization service 430 may also encrypt a new timestamp and a checksum of the list of results, using $K_{PuH}$:

$E(K_{PuH}, time, checksum)$

The anonymization service 430 may send $E(K_{PuH}, time, checksum)$ and the randomly ordered list containing each $E(K_{PuH}, data)$ to the head end 410. The head end 410 may then decrypt these values. The head end 410 may therefore perform the decryption $D(K_{PrH}, E(K_{PuH}, time, checksum))$ and recover the time and checksum values. The head end 410 may check that the checksum is consistent with the data received, and that the timestamp does not match those of previously received messages. The head end may also perform $D(K_{PrH}, E(K_{PuH}, data_i))$ and recover each segment $data_i$.

In an embodiment, each STB may provide entertainment and advertising content to its respective household. These homes are shown in FIG. 4 as households 471, . . . , 473. Generally, an STB may access or store information that requires privacy, e.g., household income, demographics of household members, geographical location of the home, etc. It is this household information that may be used to match the criteria for the ad. The ad may be targeted at households with a certain income level, or households having residents of a certain age group, for example. If the criteria is met, then the $STB_i$ may state in data that its household meets the criteria and is eligible to view the ad.

In an embodiment, the head end 410 may be part of the infrastructure for a content distributor 460. Content distributor 460 may be a cable company, a satellite television company, or an internet content delivery provider, for example. The anonymization service 430 may be managed by a third party 480, independent of the content distributor 460.

Figure 5:
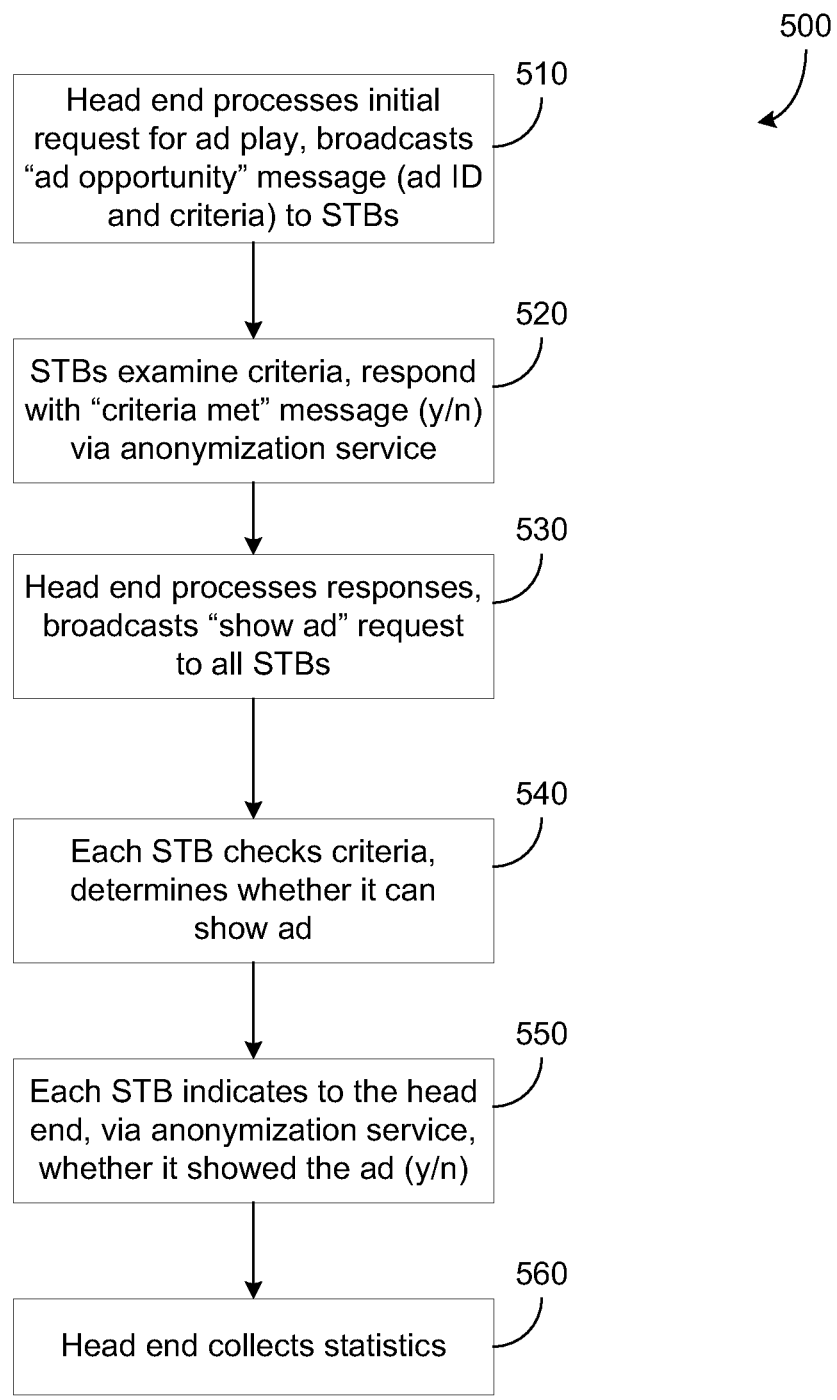
FIG. 5 is a flowchart illustrating overall processing of an embodiment.

The anonymization protocol discussed above may be used as illustrated in FIG. 5, according to an embodiment. At 510, a request to distribute an advertisement may be received and processed by the head end. This request may be accompanied by criteria for display, such that the ad is targeted to households meeting these criteria, as well as the number of households that should be reached. The head end may send the criteria and an identifier for the ad to the STBs in an "ad opportunity" message. In an embodiment, the actual advertisement (e.g., and audio/visual file) may have previously been distributed to all STBs and stored there. The head end therefore can send the ID of the ad to the STBs, without having to send the actual ad.

At 520, all STBs may examine the criteria in the "ad opportunity" message, compare it to information about the STB's household stored on the STB, and determine whether the criteria is met. It then may reply to the head end via the anonymization service by sending a "criteria met" message. To do this, the anonymization protocol discussed above with respect to FIGS. 3A, 3B, and 4 may be used. In this case, the data transmitted by each STB to the head end may include an indication as to whether the criteria is met by the household of the STB.

At 530, the head end may process the anonymized "criteria met" responses and determine the number of STBs that have responded in the affirmative, i.e., indicating that their respective households meet the criteria. The head end may then broadcast, to all the STBs, a request to show the ad. In an embodiment, this message may be encrypted by the head end. In such an embodiment, the encryption may be performed using a private key held by the head end, where the corresponding public key, needed for decryption at each STB, is publicly available. Such an arrangement would prevent an unauthorized party from posing as a head end for purposes of this transmission.

At 540, each STB may make a determination as to whether the ad is to be shown. As will be described in greater detail below, this determination may include but is not limited to a determination as to whether the criteria is met. If the STB determines that the ad is to be shown, then the ad may be shown.

At 550, each STB may send the identifier of the ad and an indication of whether or not the ad was played to the head end in an "ad shown" message, again using the anonymization service and protocol described above. For each message sent by the STBs, the data field contains an indication as to whether the ad was shown, instead of an indication of whether the criteria is met. At 560, the head end may count the number of households to which the advertisement was shown.

Figure 6:
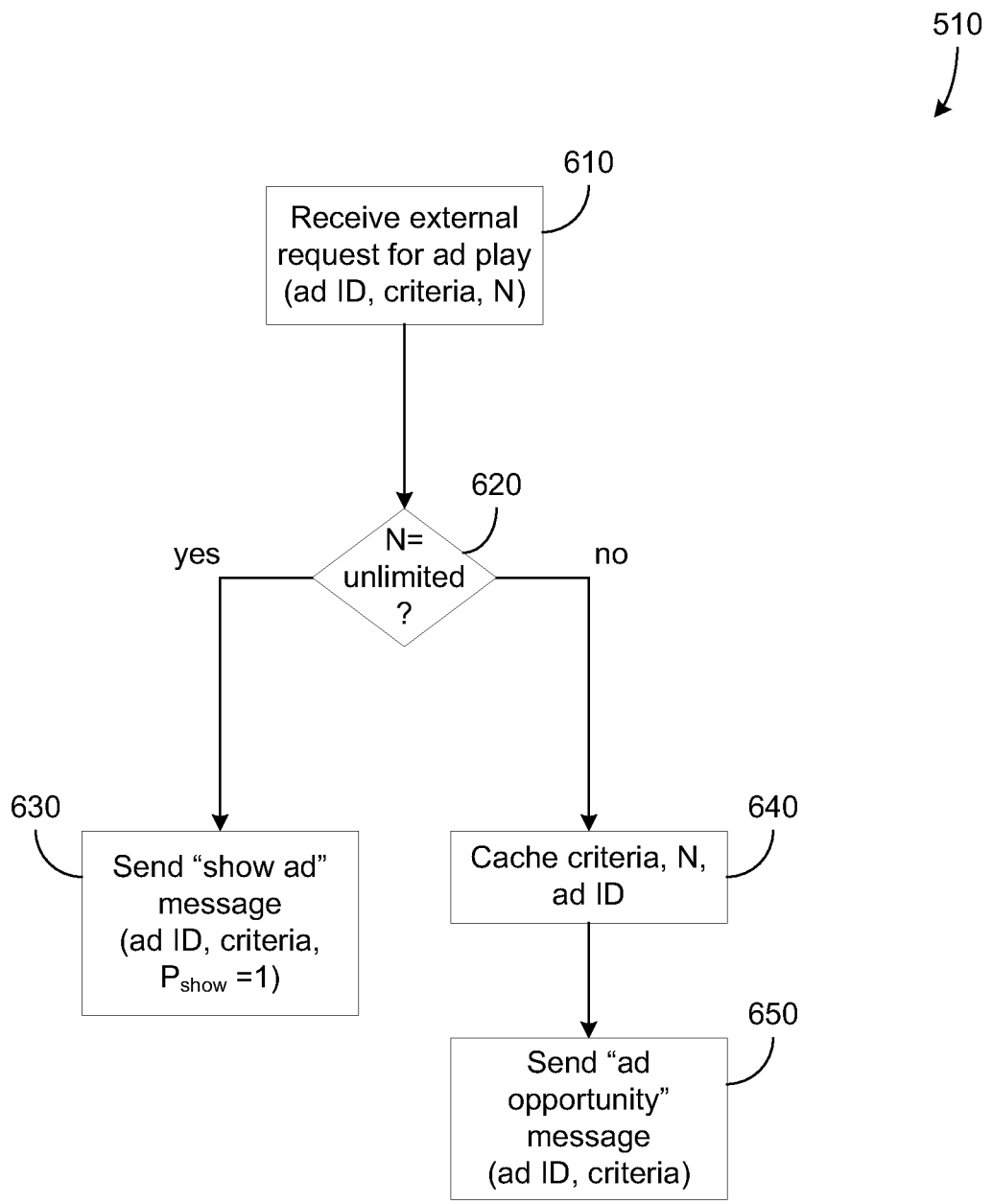
FIG. 6 is a flowchart illustrating the initial processing by the head end of a request to play an ad, according to an embodiment.

The processing of a request to distribute an advertisement (510 of FIG. 5) is illustrated in greater detail in FIG. 6, according to an embodiment. At 610, a request may be received from an external source at the head end, asking that an advertisement be played. In an embodiment, this request may include an identifier for the ad ("ad ID"), the criteria for households where the ad is to be played (e.g., particular household demographics or income level), and the number of households for which the ad is requested to be played ("N").

In some circumstances, it may be desirable to play the ad in as many households as possible. In this case, N will have an unlimited value. At 620, a determination may be made as to whether N has an unlimited value. If N is not unlimited and has a finite value, then at 640, the criteria, N, and the ad identifier may be cached at the head end, and at 650 a message may be sent to all STBs, where the message includes the ad identifier and the criteria. This message may state that there is an opportunity to show the identified advertisement for households meeting the stated criteria.

If N has an unlimited value, then at 630 the head end may send a message to all STBs telling them to show the ad if they meet the criteria, specifying the criteria, and defining the value $P_{show}=1$. The use of the value $P_{show}$ will be described in greater detail below. In this context, the setting of this value to 1 effectively tells each STB that it is eligible to show the ad if it meets the criteria.

Figure 7:
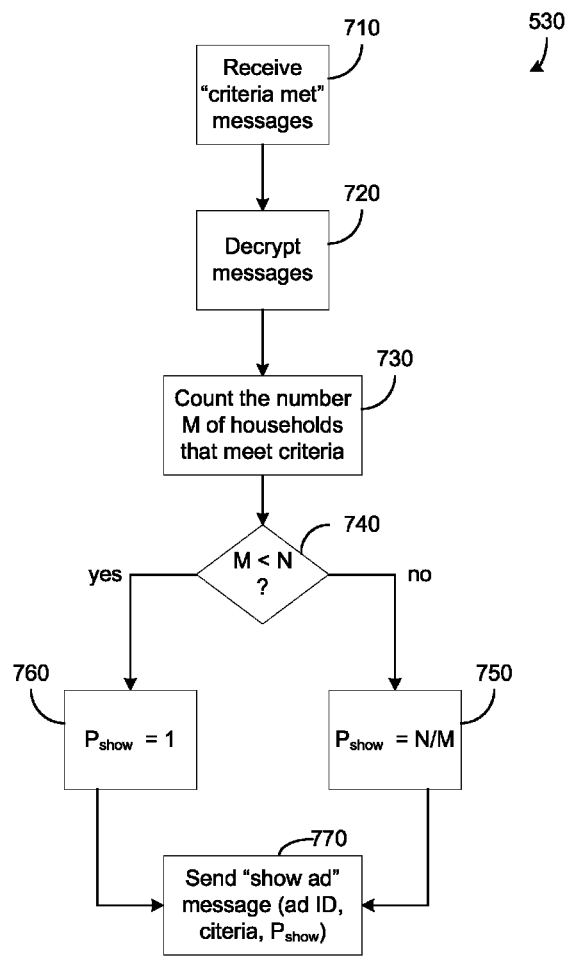
FIG. 7 is a flowchart illustrating the processing by the head end of STB responses, according to an embodiment.

The processing, by the head end, of STB responses (530 of FIG. 5) is illustrated in greater detail in FIG. 7, according to an embodiment. At 710, the head end may receive one or more messages from respective STBs indicating that the criteria is met by their respective households. Note that while the head end receives these messages, it never knows the identities of the specific households or STBs that have responded. At 720, the head end may decrypt these messages using the private component of its public key pair, as described above. At 730, the head end may count the number of affirmative responses to learn the total number M of households that meet the criteria. Negative responses may be ignored.

At 740, a determination may be made as to whether M<N. If not, then at 750 the head end may define $P_{show}=N/M$, where N is the number of households are required or desired by the advertiser to see the ad. This value represents the proportion of eligible households (i.e., those that meet the criteria) that may be required to see the ad, in order for the goal of N to be reached. If the condition of 740 is true, then the number of households required to see the ad meets or exceeds the number of households satisfying the criteria. In this case, all eligible households may be shown the ad. This is made possible by setting $P_{show}=1$, as will be described below.

At 770, a message may be sent to all STBs, telling them that if their respective households meet the criteria, then they are eligible to show the ad, pending further processing at the STB involving $P_{show}$, as will be described below. In an embodiment, this message may include an identifier for the ad, the criteria, and $P_{show}$. Further, in an embodiment, these values may be sent in encrypted form, encrypted using the private component of the key pair of the head end, $K_{PrH}$.

Figure 8:
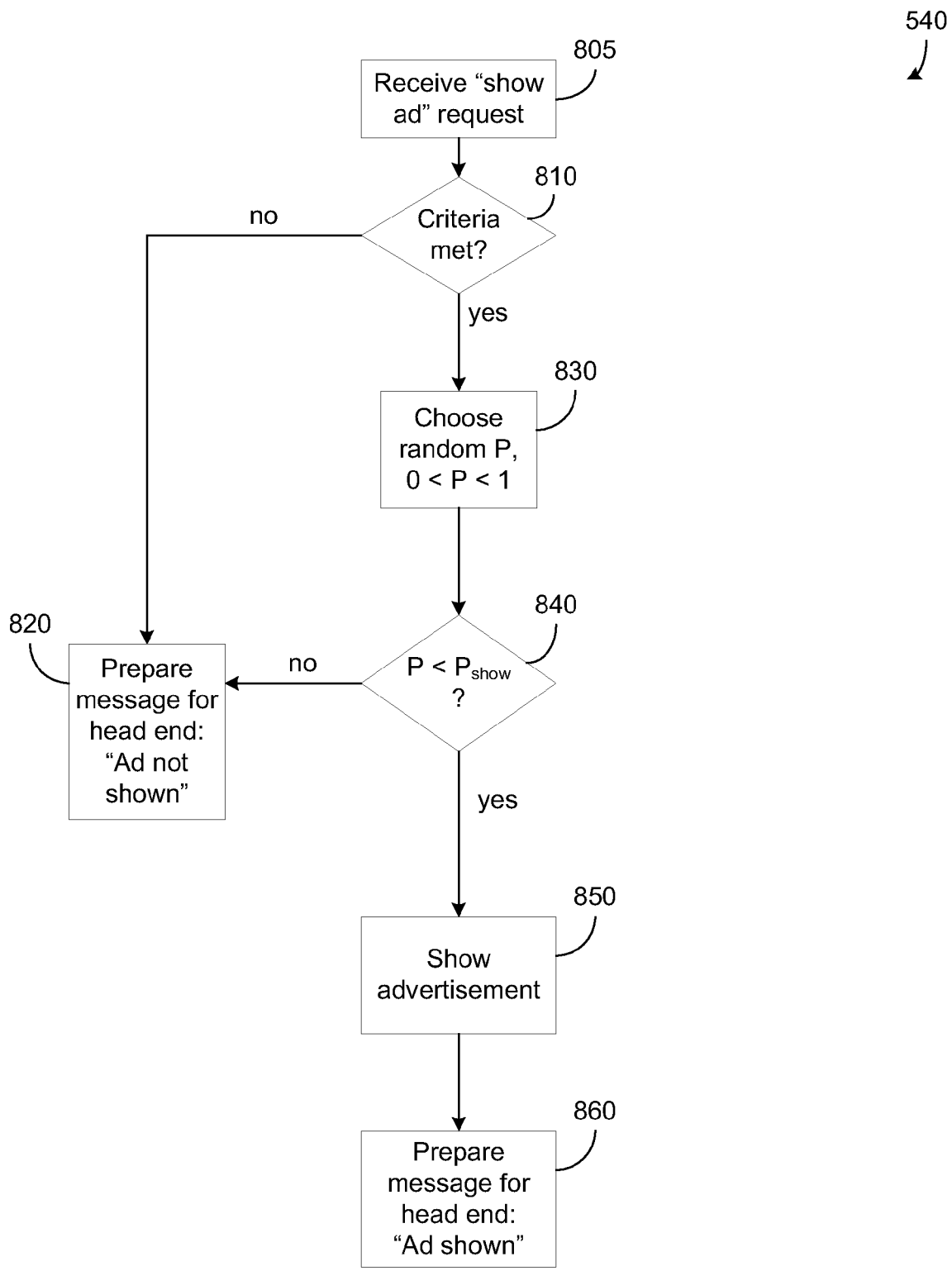
FIG. 8 is a flowchart illustrating the processing by an STB to determine whether to show an ad, according to an embodiment.

The determination of whether to show the advertisement (540 of FIG. 5) is illustrated in greater detail in FIG. 8, according to an embodiment. At 805, the STB may receive a "show ad" message from the head end including an add ID, criteria, and $P_{show}$. At 810, a determination may be made at the STB as to whether the household meets the criteria. If not, then at 820 the STB may prepare a negative "ad shown" message to be sent to the head end via the anonymization protocol; this message may be sent to the head end via the anonymization protocol at 550. Otherwise, at 830, a random number P may be generated, where 0<P<1. In an embodiment, the random number P may be produced using a noise source; alternatively, P may be generated using a deterministic pseudorandom data source. At 840, a determination may be made as to whether $P<P_{show}$. If so, then at 850 the advertisement may be shown. If not, then at 820 the STB may prepare a negative "ad shown" message to the head end via the anonymization protocol. At 860, a message may be prepared, saying that the ad was shown. This message may be sent to the head end via the anonymization protocol at 550.

Recall that if N is unlimited (meaning that as many households as meet the criteria are to be shown the ad), the head end defined $P_{show}=1$. If $P_{show}$ was defined by the head end to equal 1, then for every household meeting the criteria (at 810), the STB generates a random P (at 830) wherein $P<P_{show}$, and the ad may be shown in every such household at 850.

Where N is not unlimited, then $P_{show}=N/M$ as defined at the head end. By having each STB choose a random P (at 830) and determining if $P<P_{show}$ (at 840), the expected number of households showing the ad (at 850) will be equal to N.

Note that in certain embodiments, the value of $P_{show}$ as derived at a head end may be varied somewhat from the calculation shown at 750. For example, if the head end wishes to decrease the chances that the ad is displayed to fewer than N households, then it may increase the value of $P_{show}$ by a small amount. This may result in a larger set of STBs showing the ad. Analogously, if the head end wishes to decrease the chances that the ad is displayed to more than N households, then it may decrease the value of $P_{show}$ by a small amount.

FIG. 9 schematically illustrates the anonymization protocol as it is applied above, according to an embodiment. At 910, the head end may issue a message to all STBs, announcing the opportunity to show an advertisement. This message may include the ID for the ad, plus the criteria for showing the ad. At 920, each STB may respond with a message that states whether the criteria is met by the particular household. These messages may be sent to the anonymization service. Each message may include an encrypted indication of whether the criteria is met, where the encryption may be performed using the public component $K_{PuH}$ of an asymmetric key pair. The private component of this key pair may be held only by the headend. This encrypted indication is shown as $E(K_{PuH}$, criteria_met_y/n), where criteria_met_y/n occupies the data field shown in FIGS. 3A and B. This encrypted indication may be further encrypted, along with an ID of the STB (shown as $STB_i$), a timestamp, and authentication information, using the public component $K_{PuA}$ of another asymmetric key pair. The private component of this latter public key pair may be held by the anonymization service. The message is therefore shown as $E(K_{PuA}, E(K_{PuH}, \text{criteria\_met\_y/n}), ID_{STBi}, \text{time}, \text{auth\_info})$, where such a message may be generated by each $STB_i$ for transmission to the anonymization service. While the figure shows three such messages for different STBs, it is to be understood that the total number of STBs (and associated messages) may be greater or fewer.

The anonymization service may decrypt each such message using its private key, to recover the ID of the $STB_i$, the time stamp, and the authentication information. The latter two values may be checked by the anonymization service as described above. This decryption may also recover the encrypted indication as to whether the criteria is met by $STB_i$, $E(K_{PuH}, \text{criteria\_met\_y/n})$. This encrypted indication may then be combined with the indication received from each $STB_i$ and forwarded by the anonymization service, as a set, to the head end at 930. In an embodiment, the ordering of the set of encrypted indications may be randomized before sending to the head end. The anonymization service may also send the ID of the advertisement, a timestamp, and a checksum that may be a function of the encrypted indications. These latter three values may be encrypted using $K_{PuH}$.

The head end may then decrypt the received messages using its private key, to identify the ad and to count the number of STBs at which the criteria is met. The head end never knows the identities of the specific STBs which meet the criteria. The checksum may also check the received timestamp and checksum values. The head end may calculate a value $P_{show}$ as described above, based in part on the number of households indicating that the criteria are met. At 940, the head end may then send a message to each STB, instructing it to show the ad if the criteria is met and if the values P (generated at the STBs as described above) permit. As described above, this message may be encrypted by the head end using $K_{PrH}$. In this case, each STB would decrypt this message using $K_{PuH}$.

Some STBs will then show the ad while others may not. At each STB an encrypted indication may be generated, identifying the ad and stating whether the ad was shown. This indication may be encrypted using $K_{PuH}$, and is shown as $E(K_{PuH}, \text{ad ID}, \text{ad\_shown\_y/n})$. Here, the fields ad ID and ad_shown_y/n collectively represent the field of data illustrated in FIGS. 3A and B. The particular STB is not identified in this indication. This indication may then be further encrypted using $K_{PuA}$, along with the identifier of the STB, a timestamp, and authentication information. This message is therefore shown as $E(K_{PuA}, E(K_{PuH}, \text{ad ID}, \text{ad\_shown\_y/n}), ID_{STBi}, \text{time}, \text{auth\_info})$. At 950, each STB may send such a message to the anonymization service, incorporating the appropriate indication of whether the ad was shown by the STB.

The anonymization service may then decrypt the messages to recover the ID of the $STB_i$, the time stamp, and the authentication information. The latter two values may be checked as described above. This decryption may also yield the encrypted indication as to whether the ad was shown, $E(K_{PuH}, \text{ad\_shown\_y/n})$. This encrypted indication may then be combined with indications from each $STB_i$ and forwarded by the anonymization service collectively to the head end at 960. The anonymization service may also send the ID of the advertisement, a timestamp, and a checksum that may be a function of the encrypted indications. These latter three values may be encrypted using $K_{PuH}$.

The head end may then decrypt the received messages using its private key, to identify the ad and to process the checksum and timestamp. The head end can then count the number of STBs that showed the advertisement.

One or more features disclosed herein may be implemented in hardware, software, firmware, or combinations thereof, including discrete and integrated circuit logic, application specific integrated circuit (ASIC) logic, programmable gate arrays, and/or microcontrollers, or may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Software or firmware embodiments are illustrated in the context of computing systems shown in FIGS. 10-12. In FIG. 10, system 1000 may be located at a head end, and may include a processor 1020 and a body of memory 1010 that may include one or more computer readable media that may store computer program logic 1040. Memory 1010 may be implemented as a hard disk and drive, a removable media such as a compact disk and drive, a read-only memory (ROM) or random access memory (RAM) device, for example. Processor 1020 and memory 1010 may be in communication using any of several technologies known to one of ordinary skill in the art, such as a bus. Computer program logic 1040 contained in memory 1010 may be read and executed by processor 1020. One or more I/O ports and/or I/O devices, shown collectively as I/O 1030, may also be connected to processor 1020 and memory 1010.

Computer program logic 1040 may include initial request processing logic 1050. This logic may be responsible for processing an initial request for the playing of an advertisement, as received from an advertiser or content provider at the head end. As noted above, such an initial request may also include an identifier for the specific advertisement, criteria for households that may play the ad, and a value N representing the number of households that are to view the ad. Initial request processing logic 1050 may be responsible for instructing STBs to show the ad when N is unlimited, and otherwise informing STBs that there is an opportunity to show this ad.

Computer program logic 1040 may also comprise STB response processing logic 1060. This body of logic may be responsible for receiving messages from STBs indicating that criteria have been met, decrypting these messages, counting the number of affirmative responses, computing $P_{show}$ as necessary, and instructing STBs to show the advertisement. Note that in alternative embodiments, the decryption process may be controlled by logic 1060, where the actual decryption may be performed by one or more hardware components.

Computer program logic 1040 may also comprise statistics collection logic 1070. Logic 1070 may be responsible for receiving messages from STBs indicating whether the ad has been shown, and counting the total number of households that have been shown the ad.

In alternative embodiments, the computer program logic 1040 may be organized differently in order to implement the processing described herein. Different logic modules may be used instead of those shown in FIG. 10. Moreover, in alternative embodiments, more or fewer logic modules may be used, as would be understood by those of ordinary skill in the art.

Referring to FIG. 11, system 1100 may be located at an anonymization service, and may include a processor 1120 and a body of memory 1110 that may include one or more computer readable media that may store computer program logic 1140. Memory 1110 may be implemented as a hard disk and drive, a removable media such as a compact disk and drive, or a read-only memory (ROM) or random access memory (RAM) device, for example. Processor 1120 and memory 1110 may be in communication using any of several technologies known to one of ordinary skill in the art, such as a bus. Computer program logic 1140 contained in memory 1110 may be read and executed by processor 1120. One or more I/O ports and/or I/O devices, shown collectively as I/O 1130, may also be connected to processor 1120 and memory 1110.

Computer program logic 1140 may include decryption logic 1150. This logic may be responsible for decrypting the encrypted messages coming from the STBs, as described above. Computer program logic 1140 may also include verification logic 1160, which may be responsible for verifying the data included in those messages, such as the authentication data, and checking the timestamp as discussed above. Computer program logic 1140 may also comprise encryption logic 1170. Logic 1170 may be responsible for encrypting messages to be sent to the head end, as described above.

In alternative embodiments, the computer program logic 1140 may be organized differently in order to implement the processing described herein. Different logic modules may be used instead of those shown in FIG. 11. Moreover, in alternative embodiments, more or fewer logic modules may be used, as would be understood by those of ordinary skill in the art.

Moreover, while the embodiment of FIG. 11 suggests that encryption and decryption may be performed in software or firmware, in alternative embodiments encryption and decryption may be performed in hardware. In such embodiments, the control of the encryption and decryption operations may be performed by processor 1120 as directed by computer program logic 1140.

Referring to FIG. 12, system 1200 may be located at an STB, and may include a processor 1220 and a body of memory 1210 that may include one or more computer readable media that may store computer program logic 1240. Memory 1210 may be implemented as a hard disk and drive, a removable media such as a compact disk and drive, or a read-only memory (ROM) or random access memory (RAM) device, for example. Processor 1220 and memory 1210 may be in communication using any of several technologies known to one of ordinary skill in the art, such as a bus. Computer program logic 1240 contained in memory 1210 may be read and executed by processor 1220. One or more I/O ports and/or I/O devices, shown collectively as I/O 1230, may also be connected to processor 1220 and memory 1210.

Computer program logic 1240 may include household evaluation logic 1250. This logic may be responsible for comparing information about the household to the criteria for showing the advertisement, in order to determine if the criteria are met. Computer program logic 1240 may also include encryption logic 1260, which may be responsible for encrypting messages indicating whether the criteria are met and messages indicating whether an ad has been shown, for example, as described above. Computer program logic 1240 may also comprise decryption logic 1270. Logic 1270 may be responsible for decrypting messages, such as the message from the head end telling the STB to show the advertisement.

Computer program logic 1240 may also include randomization logic 1280, which may be responsible for determining a random value between 0 and 1, as described above. Alternatively, in embodiments the randomization process may use hardware for generating the random value, in which case logic 1280 may be responsible for controlling or sampling the randomization hardware. Computer program logic 1240 may also include display decision logic 1290, which may be responsible for determining whether to show an ad, given the random value P and the received value $P_{show}$, as described above.

In alternative embodiments, the computer program logic 1240 may be organized differently in order to implement the processing described herein. Different logic modules may be used instead of those shown in FIG. 12. Moreover, in alternative embodiments, more or fewer logic modules may be used, as would be understood by those of ordinary skill in the art.

Moreover, while the embodiment of FIG. 12 suggests that encryption and decryption may be performed in software or firmware, in alternative embodiments encryption and decryption may be performed in hardware. In such embodiments, the control of the encryption and decryption operations may be performed by processor 1220 as directed by computer program logic 1240.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising: receiving, at an anonymizing service node, information from a plurality of set top boxes (STBs) encrypted by each STB using a public component of a first public key pair, the information from each STB including
    an identifier of the STB,
    an identifier of an advertisement, and
    an indication as to whether one or more criteria for display of the advertisement are met,
    wherein the indication is encrypted with the public component of a second public key pair;
    decrypting the encrypted information from each STB, to recover the identifier of each STB;
    encrypting the identifier of the advertisement using the public component of the second public key pair; and
    forwarding all encrypted indications and the encrypted identifier of the advertisement together to a head end, enabling the head end to count the number M of STBs at which the criteria is met,
    wherein the private component of the first public key pair is held at the anonymizing service node and is not available to the head end and the private component of the second public key pair is held at the head end and not available to the anonymizing service, the method further comprising:
    receiving, at the anonymizing service node, further information from each STB, encrypted using the public component of the first public key pair, the further information including
    the identifier of the STB, and
    an indication of whether the advertisement was displayed at the STB, encrypted with the public component of the second key pair, decrypting the encrypted further information from each STB, to recover the identifier of each STB, said decryption performed using the private component of the first public key pair;

encrypting the identifier of the advertisement with the public component of the second public key pair; and forwarding all encrypted indications of whether the advertisement was displayed and the encrypted identifier of the advertisement together to the head end, enabling the head end to count the number of STBs that displayed the advertisement, wherein the indication of whether the advertisement was displayed is generated at each STB, wherein a decision regarding whether to display the advertisement is made at each STB in response to a command issued to each STB from the head end, wherein the command includes a parameter Pshow<=N/M, where N is the number of households desired to see the advertisement and M is the number of households indicating that the criteria is met, as counted by the headend;

wherein after receiving the command, each STB creates a random number between 0 and 1 and displays the advertisement only if the random number is less than or equal to Pshow.

2. The method of claim 1, wherein the information from each STB further includes a first timestamp and authentication data, such that the first timestamp and authentication data are also encrypted using the public component of the first public key pair; and wherein the method of claim 1 further comprises:

after decrypting the encrypted information from each STB, verifying the authentication data and determining whether the first timestamp matches any previously received timestamps.

3. The method of claim 1, wherein the further information includes authentication data and a second timestamp, such that the authentication data and the second timestamp were also encrypted using the public component of the first public key pair; and wherein the method further comprises:

after decrypting the encrypted further information, verifying the authentication data and determining whether the first timestamp matches any previously received timestamp.

4. The method of claim 3, further comprising:

calculating a checksum on the basis of the STBs' respective indications of whether the advertisement was displayed;

encrypting the checksum and said second timestamp using the public component of the second public key pair; and forwarding the encrypted checksum and second timestamp to the head end along with each of the STBs' respective indications of whether the advertisement was displayed.

5. The method of claim 1, wherein the STB creates the indication that the criteria is met, in response to a broadcast from the head end identifying an opportunity to display the advertisement and specifying the criteria for displaying the advertisement.

6. A system, comprising:

a processor; and a memory in communication with said processor, said memory for storing a plurality of processing instructions for directing said processor to:

receive information from a plurality of set top boxes (STBs) encrypted by each STB using a public component of a first public key pair, the information from each STB including an identifier of the STB, an identifier of an advertisement, and an indication as to whether one or more criteria for display of the advertisement are met, wherein the indication is encrypted with the public component of a second public key pair;

decrypt the encrypted information from each STB, to recover the identifier of each STB;

encrypt the identifier of the advertisement using the public component of the second public key pair; and forward all encrypted indications and the encrypted identifier of the advertisement together to a head end, enabling the head end to count the number M of STBs at which the criteria are met, wherein the private component of the first public key pair is held at the anonymizing service node and is not available to the head end, and the private component of the second public key pair is held at the head end and not available to the anonymizing service, wherein said memory further stores processing instructions for directing said processor to:

receive, at the anonymizing service node, further information from each STB, encrypted using the public component of the first public key pair, the further information including the identifier of the STB, and an indication of whether the advertisement was displayed at the STB, encrypted with the public component of the second key pair;

decrypt the encrypted further information from each STB, to recover the identifier of each STB, said decryption performed using the private component of the first public key encrypt the identifier of the advertisement with the public component of the second public key pair;

forward all encrypted indications of whether the advertisement was displayed and the encrypted identifier of the advertisement together, enabling the head end to count the number of STBs that displayed the advertisement, wherein the indication of whether the advertisement was displayed is generated at each STB, wherein a decision regarding whether to display the advertisement is made at each STB in response to a command issued to each STB from the head end, wherein the command includes a parameter Pshow=N/M−Pshow<=1, where N is the number of households desired to see the advertisement and M is the number of households indicating that the criteria is met, as counted by the head end; and wherein after receiving the command, each STB creates a random number between 0 and 1 and displays the advertisement only if the random number is less than or equal to Pshow.

7. The system of claim 6, wherein the information from each STB further includes a first timestamp and authentication data, such that the first timestamp and authentication data are also encrypted using the public component of the first public key pair; and wherein said memory further stores processing instructions for directing said processor to: after decrypting the encrypted information from each STB, verify the authentication data and determine whether the first timestamp matches any previously received timestamps.

8. The system of claim 6, wherein the indication further information includes authentication data and a second timestamp, such that the authentication data and the second timestamp have also been encrypted using the public component of the first public key pair; and wherein said memory further stores processing instructions for directing said processor to:

after decrypting the encrypted further information, verify the authentication data and determining whether the second timestamp matches any previously received timestamp.

9. The system of claim 8, wherein said memory further stores processing instructions for directing said processor to:

calculate a checksum on the basis of the STBs' respective indications of whether the advertisement was displayed;

encrypt the checksum and the second timestamp using the public component of the second public key pair; and forward the encrypted checksum and second timestamp to the head end along with each of the STBs' respective indications of whether the advertisement was displayed.

10. The system of claim 6, wherein the STB creates the indication that the criteria is met, in response to a broadcast from the head end identifying an opportunity to display the advertisement and specifying the criteria for displaying the advertisement.

11. A computer program product comprising a non-transitory computer useable medium having computer program logic stored thereon, the computer control logic comprising:

logic configured to cause a processor to receive information from a plurality of set top boxes (STBs) encrypted by each STB using a public component of a first public key pair, the information from each STB including an identifier of the STB, an identifier of an advertisement, and an indication as to whether one or more criteria for display of the advertisement are met, wherein the indication is encrypted with the public component of a second public key pair;

logic configured to cause the processor to decrypt the encrypted information from each STB, to recover the identifier of each STB;

logic configured to cause the processor to encrypt the identifier of the advertisement using the public component of the second public key pair; and logic configured to cause the processor to forward all encrypted indications and the encrypted identifier of the advertisement together to a head end, enabling the head end to count the number M of STBs at which the criteria are met, wherein the private component of the first public key pair is held at the anonymizing service node and is not available to the head end and the private component of the second public key pair is held at the head end and not available to the anonymizing service, wherein said computer control logic further comprises:

logic configured to cause the processor to receive, at the anonymizin service node, further information from each STB, encrypted using the public component of the first public key pair, the further information including the identifier of the STB, and an indication of whether the advertisement was displayed at the STB, encrypted with the public component of the second key pair, wherein the indication of whether the advertisement was displayed was encrypted using the public component of the first public key pair;

logic configured to cause the processor to decrypt the encrypted further information from each STB, to recover the identifier of each STB, the decryption performed using the private component of the first public key pair; and logic configured to cause the processor to forward all encrypted indications of whether the advertisement was displayed and the encrypted identifier of the advertisement together to the head end, enabling the head end to count the number of STBs that displayed the advertisement, wherein the indication of whether the advertisement was displayed is generated at each STB, wherein a decision regarding whether to display the advertisement is made at each STB in response to a command issued to each STB from the head end, wherein the command includes a parameter Pshow=N/M−Pshow<=1, where N is the number of households desired to see the advertisement and M is the number of households indicating that the criteria are met, as counted by the head end; and wherein after receiving the command, each STB creates a random number between 0 and 1 and displays the advertisement only if the random number is less than or equal to Pshow.

12. The computer program product of claim 11, wherein the information from each STB further includes a first timestamp and authentication data, such that the first timestamp and authentication data are also encrypted using the public component of the first public key pair; and wherein said computer control logic further comprises:

logic configured to cause the processor to, after decrypting the encrypted information from each STB, verify the authentication data and determine whether the first timestamp matches any previously received timestamps.

13. The computer program product of claim 11, wherein the further information includes authentication data and a second timestamp, such that the authentication data and the second timestamp have also been encrypted using the public component of the first public key pair; and wherein said computer control logic further comprises:

logic configured to cause the processor to, after decrypting the encrypted further information, verify the authentication data and determining whether the second timestamp matches any previously received timestamp.

14. The computer program product of claim 13, wherein said computer control logic further comprises:

logic configured to cause the processor to calculate a checksum on the basis of the STBs' respective indications of whether the advertisement was displayed;

logic configured to cause the processor to encrypt the checksum and the second timestamp using the public component of the second public key pair; and logic configured to cause the processor to forward the encrypted checksum and second timestamp to the head end along with each of the STBs' respective indications of whether the advertisement was displayed.

* * * * *